(12) United States Patent
Kishita et al.

(10) Patent No.: US 8,837,276 B2
(45) Date of Patent: Sep. 16, 2014

(54) RELAY APPARATUS, RELAY METHOD AND COMPUTER PROGRAM

(75) Inventors: Noriaki Kishita, Tokyo (JP); Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 50 days.

(21) Appl. No.: 13/635,602

(22) PCT Filed: Mar. 18, 2011

(86) PCT No.: PCT/JP2011/056534
§ 371 (c)(1),
(2), (4) Date: Sep. 17, 2012

(87) PCT Pub. No.: WO2011/115248
PCT Pub. Date: Sep. 22, 2011

(65) Prior Publication Data
US 2013/0010683 A1 Jan. 10, 2013

(30) Foreign Application Priority Data
Mar. 18, 2010 (JP) .................................. 2010-062695

(51) Int. Cl.
*H04J 1/10* (2006.01)
*H04L 12/725* (2013.01)

(52) U.S. Cl.
CPC .................................. *H04L 45/304* (2013.01)
USPC .......................................... 370/224; 370/225

(58) Field of Classification Search
None
See application file for complete search history.

(56) References Cited

U.S. PATENT DOCUMENTS

| | | | |
|---|---|---|---|
| 8,279,762 B2 | 10/2012 | Ozaki | |
| 2009/0147690 A1* | 6/2009 | King | 370/245 |
| 2009/0257345 A1 | 10/2009 | King | |
| 2010/0034081 A1 | 2/2010 | Yoshimura | |

FOREIGN PATENT DOCUMENTS

| | | |
|---|---|---|
| JP | 2002-077311 | 3/2002 |
| JP | 2006-067040 | 3/2006 |
| JP | 3750546 | 3/2006 |
| JP | 3750546 B2 * | 3/2006 |
| JP | 2006067040 A * | 3/2006 |
| JP | 2009-010441 | 1/2009 |
| JP | 2009-089284 | 4/2009 |
| JP | 2010-041568 | 2/2010 |

OTHER PUBLICATIONS

JP Office Action dated Jun. 4, 2013, with English translation; Application No. 2012-505763.
International Search Report, PCT/JP2011/056534, Apr. 26, 2011.
Extended European Search Report dated Dec. 5, 2013, with English Translation; Application No. 11756431.0.
Y(J) Stein et al, Rad Data Communications: "TDM over IP; draft-ietf-pwe3-tdmoip-06.txt", vol. pwe3, No. 6, Dec. 5, 2006, XP015048055.
JP Office Action dated Nov. 5, 2013, with English Translation; Application No. 2012-505763.

* cited by examiner

*Primary Examiner* — Jeffrey M Rutkowski
*Assistant Examiner* — Hardikkumar Patel
(74) *Attorney, Agent, or Firm* — Young & Thompson

(57) ABSTRACT

A relay apparatus includes a first control section which connects to a first network, a second control section which connects to a second network, the type of which is different from that of the first network, and a relay section which selects a path to be operated as an active system from the first network and the second network and switches paths based on information regarding the first network and information regarding the second network, wherein the second control section converts a transmission unit for transmission in the first network into a transmission unit for transmission in the second network, and transmits the transmission unit to the second network.

4 Claims, 13 Drawing Sheets

| SF | SD | ERROR LEVEL |
|----|----|-------------|
| 0  | 0  | 1           |
| 0  | 1  | 2           |
| 1  | 0  | 3           |
| 1  | 1  | 4           |

RELAY APPARATUS, RELAY METHOD AND COMPUTER PROGRAM

TECHNICAL FIELD

The present invention relates to technology for switching a plurality of paths.

BACKGROUND ART

In the related art, when link switching is realized by implementing a redundant configuration in a network, the implementation is made using the same type of link. For example, for a redundant configuration using a packet network, switching of a link from a packet network to a packet network is implemented using a router. In addition, for example, for a redundant configuration using a time division-multiplexing (TDM) network, link switching from a TDM network to a TDM network is realized. Although a redundant network is also configured between interface converters in technology disclosed in Patent Document 1, both an active (ACT) system and a reserve system are implemented using a packet network.

DOCUMENTS OF THE PRIOR ART

Patent Documents

[Patent Document 1] Japanese Unexamined Patent Application, First Application No. 2006-67040

DISCLOSURE OF INVENTION

Problem to be Solved by the Invention

In the related art, there is a problem in that it is difficult to configure a redundant network in a state in which the number of the same type of networks is only one. For example, it may be impossible to configure a redundant network in a state in which only one TDM network and one packet network are provided.

The present invention has been made in view of such circumstances, and an object of the present invention is to provide a technology for enabling a redundant network to be configured in a state in which the number of the same type of networks is only one.

Means for Solving the Problem

According to an aspect of the present invention, a relay apparatus is provided, including: a first control section which connects to a first network; a second control section which connects to a second network, the type of which is different from that of the first network; and a relay section which selects a path to be operated as an ACT system from the first network and the second network and performs path switching based on information regarding the first network and information regarding the second network, wherein the second control section converts a transmission unit for transmission in the first network into a transmission unit for transmission in the second network, and transmits the transmission unit to the second network.

According to an aspect of the present invention, a relay method is provided, including the steps of: converting, by a relay apparatus, a transmission unit for transmission in a first network into a transmission unit for transmission in a second network, and transmitting the transmission unit to the second network, wherein the relay apparatus includes a first control section for connecting to the first network and a second control section for connecting to the second network, the type of which is different from that of the first network; and selecting, by the relay apparatus, a path to be operated as an ACT system from the first network and the second network and performing path switching based on information regarding the first network and information regarding the second network.

According to an aspect of the present invention, a computer program is provided for causing an apparatus, which includes a first control section for connecting to a first network and a second control section for connecting to a second network, the type of which is different from that of the first network, to execute the steps of: converting a transmission unit for transmission in the first network into a transmission unit for transmission in the second network, and transmitting the transmission unit to the second network; and selecting a path to be operated as an ACT system from the first network and the second network and performing path switching based on information regarding the first network and information regarding the second network.

Effect of the Invention

According to the present invention, it is possible to configure a redundant network in a state in which the number of the same type of networks is only one.

EMBODIMENTS FOR CARRYING OUT THE INVENTION

Figure 1:
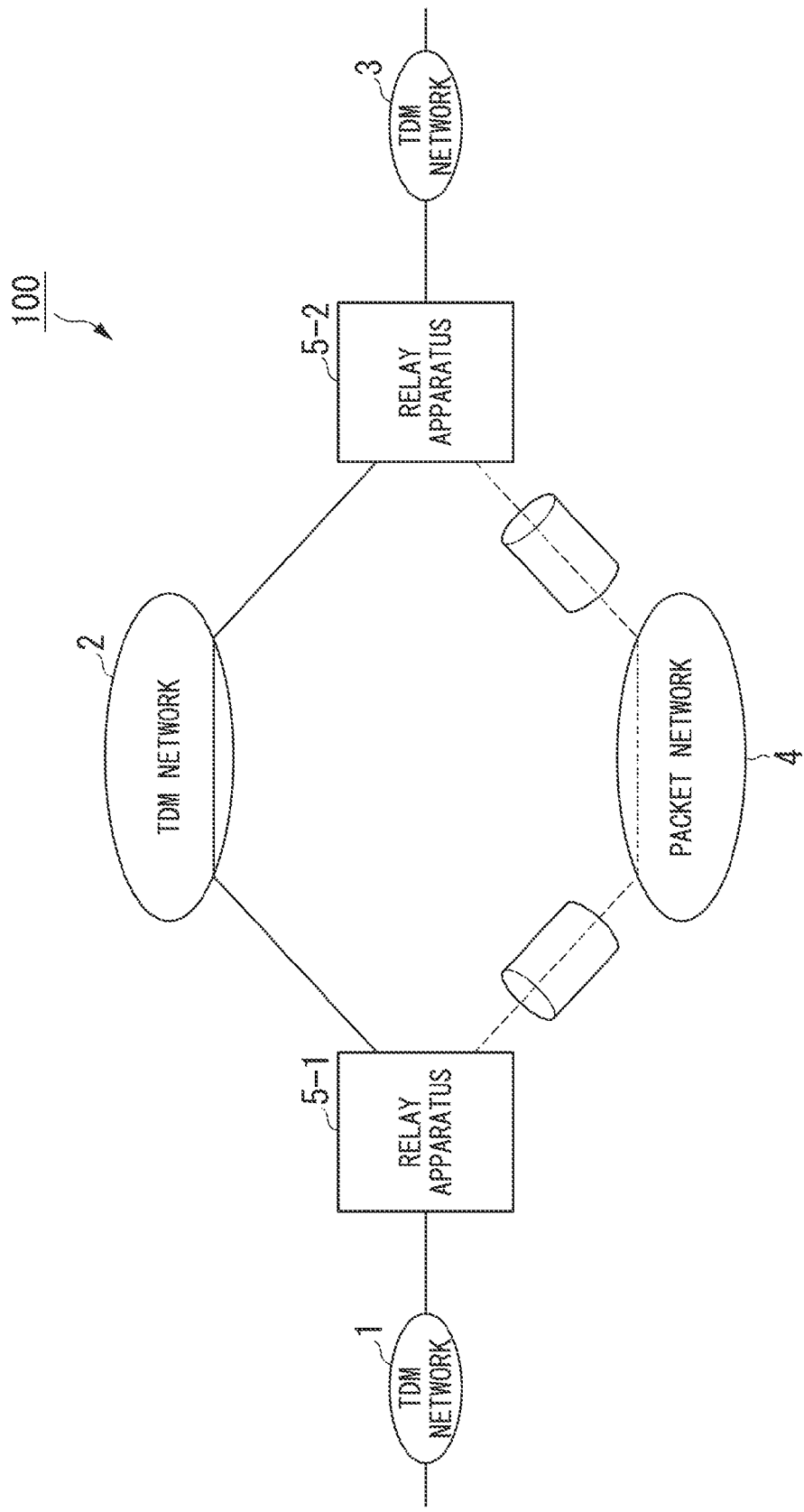
FIG. 1 is a system configuration diagram illustrating a system configuration of a redundant network system.

FIG. 1 is a system configuration diagram illustrating a system configuration of a redundant network system 100. The redundant network system 100 includes TDM networks 1, 2, and 3, a packet network 4, and relay apparatuses 5-1 and 5-2. Because the relay apparatuses 5-1 and 5-2 have the same configuration, the relay apparatuses 5-1 and 5-2 are referred to as "relay apparatus 5" in the following description.

The TDM networks 1 to 3 are configured using a plurality of TDM communication apparatuses, and are networks in which a TDM signal (TDM frame) is transmitted as a transmission unit (protocol data unit (PDU)). The TDM network 1 receives an input of a TDM signal from a communication apparatus (not illustrated) or the relay apparatus 5-1, and outputs a TDM signal to a communication apparatus (not illustrated) or the relay apparatus 5-1. The TDM network 2 receives an input of a TDM signal from the relay apparatus 5-1 or 5-2, and outputs a TDM signal to the relay apparatus 5-1 or 5-2. The TDM network 3 receives an input of a TDM signal from a communication apparatus (not illustrated) or the relay apparatus 5-2, and outputs a TDM signal to a communication apparatus (not illustrated) or the relay apparatus 5-2.

The packet network 4 is configured using a plurality of packet communication apparatuses, and is a network in which a packet is transmitted as a transmission unit (PDU). The packet network 4 receives an input of a packet from the relay apparatus 5-1 or 5-2, and outputs a packet to the relay apparatus 5-1 or 5-2.

One of the TDM network 2 and the packet network 4 operates as a path of an ACT system, and the other operates as a standby (SBY) system. The relay apparatus 5 transmits equivalent data to both the ACT system and the SBY system. The equivalent data used herein has a different transmission unit, but has the same content in payload data itself. In addition, the relay apparatus 5 receives signals from the ACT system and the SBY system, and determines failures occurring in the ACT system and the SBY system based on the received signals. The relay apparatus 5 determines a path to be operated as the ACT system based on a determination result, and switches the ACT system and the SBY system if necessary. The relay apparatus 5 transmits data received from the ACT system to a path serving as a downstream side.

Hereinafter, a plurality of embodiments of the relay apparatus 5 will be described.

First Embodiment

Figure 2:
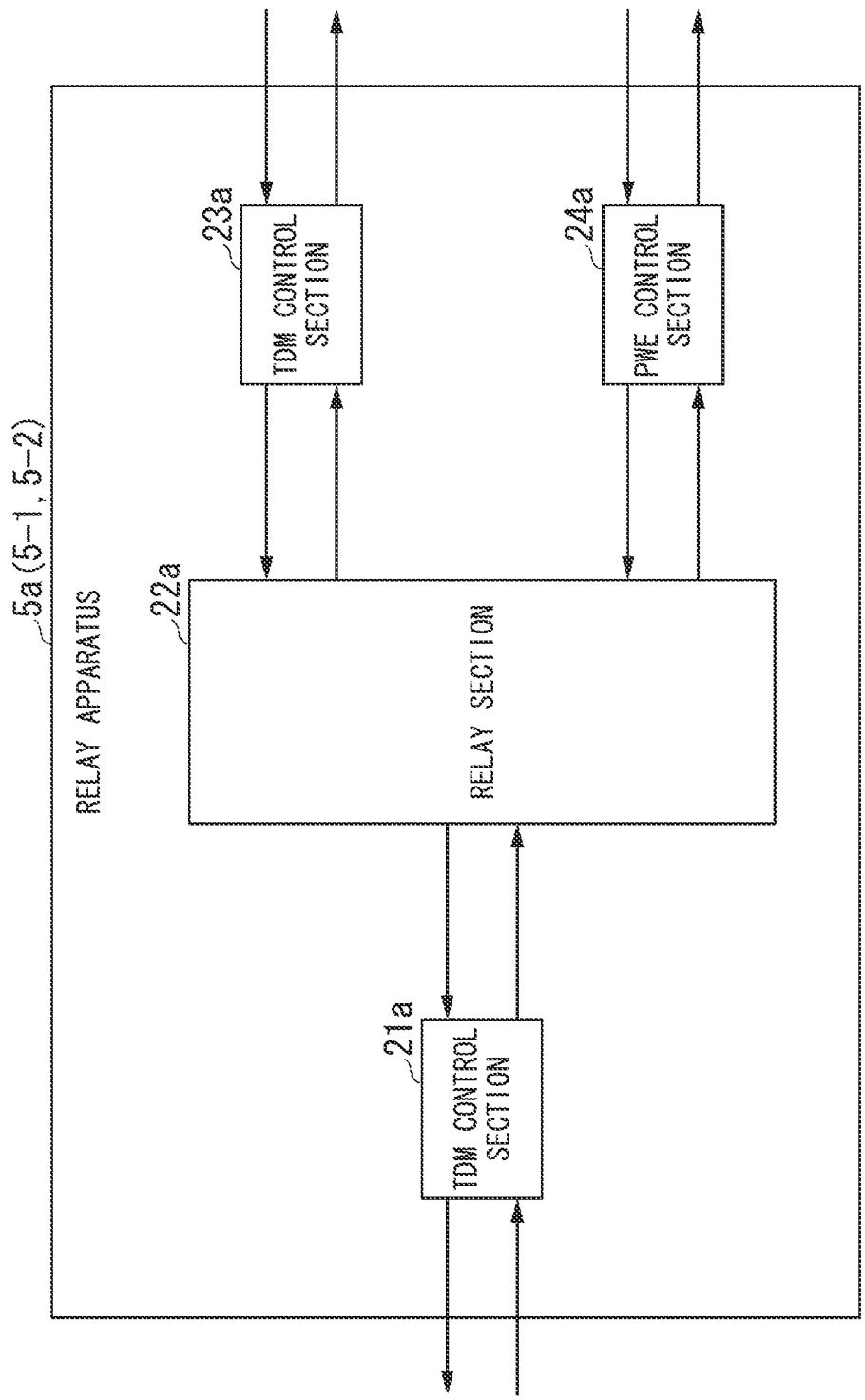
FIG. 2 is a schematic block diagram illustrating a functional configuration of a relay apparatus of a first embodiment.

FIG. 2 is a schematic block diagram illustrating a functional configuration of a relay apparatus 5a (5-1, 5-2) of the first embodiment. The relay apparatus 5a includes a central processing unit (CPU), a memory, and/or an auxiliary storage apparatus connected by a bus, and functions as an apparatus including a TDM control section 21a, a relay section 22a, a TDM control section 23a, and a PWE control section 24a. All or some functions of the relay apparatus 5a may be implemented using hardware such as an application-specific integrated circuit (ASIC), a programmable logic device (PLD), and/or a field-programmable gate array (FPGA). The relay program may be recorded on a computer-readable recording medium. An example of the computer-readable recording medium is a flexible disk, a magneto-optical disc, a read-only memory (ROM), a portable medium such as a compact disc-ROM (CD-ROM), or a storage apparatus such as a hard disk embedded in a computer system.

The TDM control section 21a is configured using a TDM card, and has an interface with the TDM network. The TDM control section 21a of the relay apparatus 5-1 has an interface with the TDM network 1, and the TDM control section 21a of the relay apparatus 5-2 has an interface with the TDM network 3. The relay section 22a determines a path to be operated as the ACT system, and switches a transmission source of a signal to be relayed to the TDM control section 21a to the TDM control section 23a or the PWE control section 24a. The TDM control section 23a has an interface with the TDM network 2. The TDM network 2 corresponds to a first network, and the TDM control section 23a has a function as at least a first control section. The PWE control section 24a is configured using PWE technology, and has an interface with the packet network 4. The packet network 4 corresponds to a second network, and the PWE control section 224a has a function as at least a second control section. A main signal to be transmitted from the TDM control sections 21a and 23a and the PWE control section 24a to the relay section 22a is transmitted in the form of an (SF/SD+TDM) signal in which an error information SF/SD label is assigned to the TDM signal.

Figure 3:
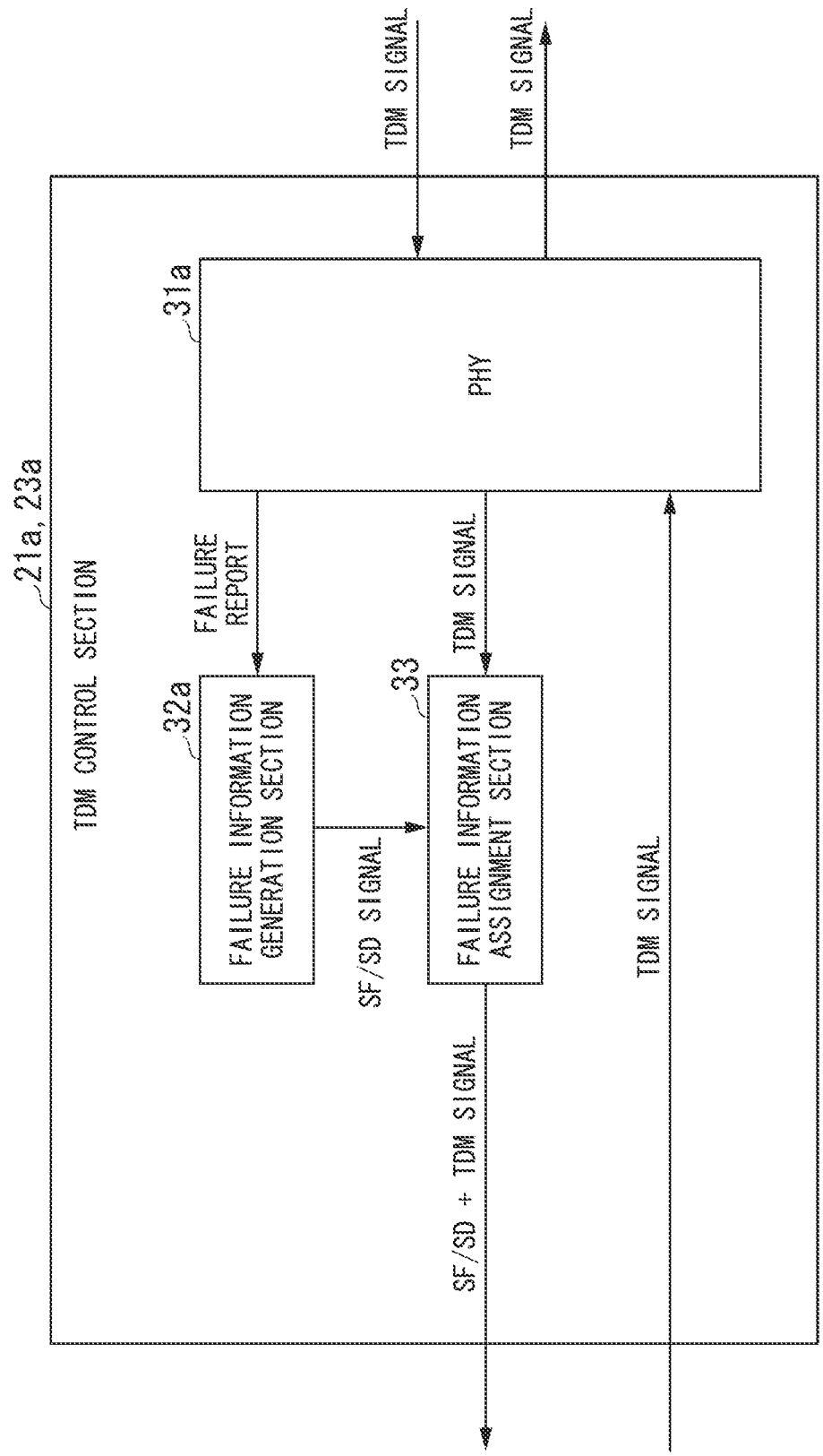
FIG. 3 is a schematic block diagram illustrating a functional configuration of TDM control sections of the first embodiment.

FIG. 3 is a schematic block diagram illustrating a functional configuration of the TDM control sections 21a and 23a of the first embodiment. The TDM control sections 21a and 23a have the same configuration except that a connected TDM network is different. Hereinafter, the TDM control sections 21a and 23a will be described with reference to an example of the TDM control section 23a. The TDM control section 23a is configured, for example, using a TDM card. The TDM control section 23a includes PHY 31a, a failure information generation section 32a, and the failure information assignment section 33. All or some functions of the TDM control section 23a may be implemented using hardware such as an ASIC, a PLD, and/or an FPGA.

The PHY 31a is configured using a chip to perform a process of a physical layer and operates as an interface with the TDM network 2. Specifically, the PHY 31a receives a TDM signal from the TDM network 2, and transmits the received TDM signal to the failure information assignment section 33. In addition, the PHY 31a receives a TDM signal from the relay section 22a, and transmits the received TDM signal to the TDM network 2.

In addition, the PHY 31a senses the occurrence of a failure in the TDM network 3 or the relay apparatus 5a of an opposite side connected via the TDM network 3. For example, the PHY 31a senses a failure as a link disconnection when a failure has occurred in a cable. In addition, the PHY 31a senses a failure as a link disconnection or lost synchronization when the failure has occurred in the TDM control section 23a of the relay apparatus 5a of the opposite side. In addition, the PHY 31a may sense a failure as a cyclic redundancy check (CRC) error when a link is an extended super frame (ESF) of a T1 link or an E1 link. If an alarm indication signal (AIS) is transmitted from the relay apparatus 5a of the opposite side, the PHY 31a may sense a failure by receiving the AIS. Other technology may be applied as technology in which the PHY 31a senses a failure. As described above, the PHY 31 has a function as at least a first sensing section.

The PHY 31a reports information regarding the sensed failure to the failure information generation section 32a. A target for which the PHY 31a of the TDM control section 21a senses the occurrence of a failure is the TDM network 1 and a communication apparatus (not illustrated) connected via the TDM network 1.

The failure information generation section 32a receives information (failure report) regarding a failure from the PHY 31a. The failure information generation section 32a assigns the information regarding the failure reported from the PHY 31a to an SF/SD label, and generates an SF/SD signal. More specifically, a value of the SF/SD signal is preset for each piece of content or degree of a failure (error) that is likely to be reported to the failure information generation section 32a. The failure information generation section 32a pre-stores a failure table in which the content and degrees of failures are associated with SF/SD signals. The failure information generation section 32a selects an SF/SD signal corresponding to the failure report received from the PHY 31a according to the failure table. The failure information generation section 32a generates the selected SF/SD signal, and transmits the generated SF/SD signal to the failure information assignment section 33.

The failure information assignment section 33 receives a TDM signal from the PHY 31a. In addition, the failure information assignment section 33 receives the SF/SD signal from the failure information generation section 32a. The failure information assignment section 33 assigns the SF/SD signal received from the failure information generation section 32a to the TDM signal received from the PHY 31a, and generates an (SF/SD+TDM) signal. The failure information assignment section 33 transmits the generated (SF/SD+TDM) signal to the relay section 22a.

Figure 4:
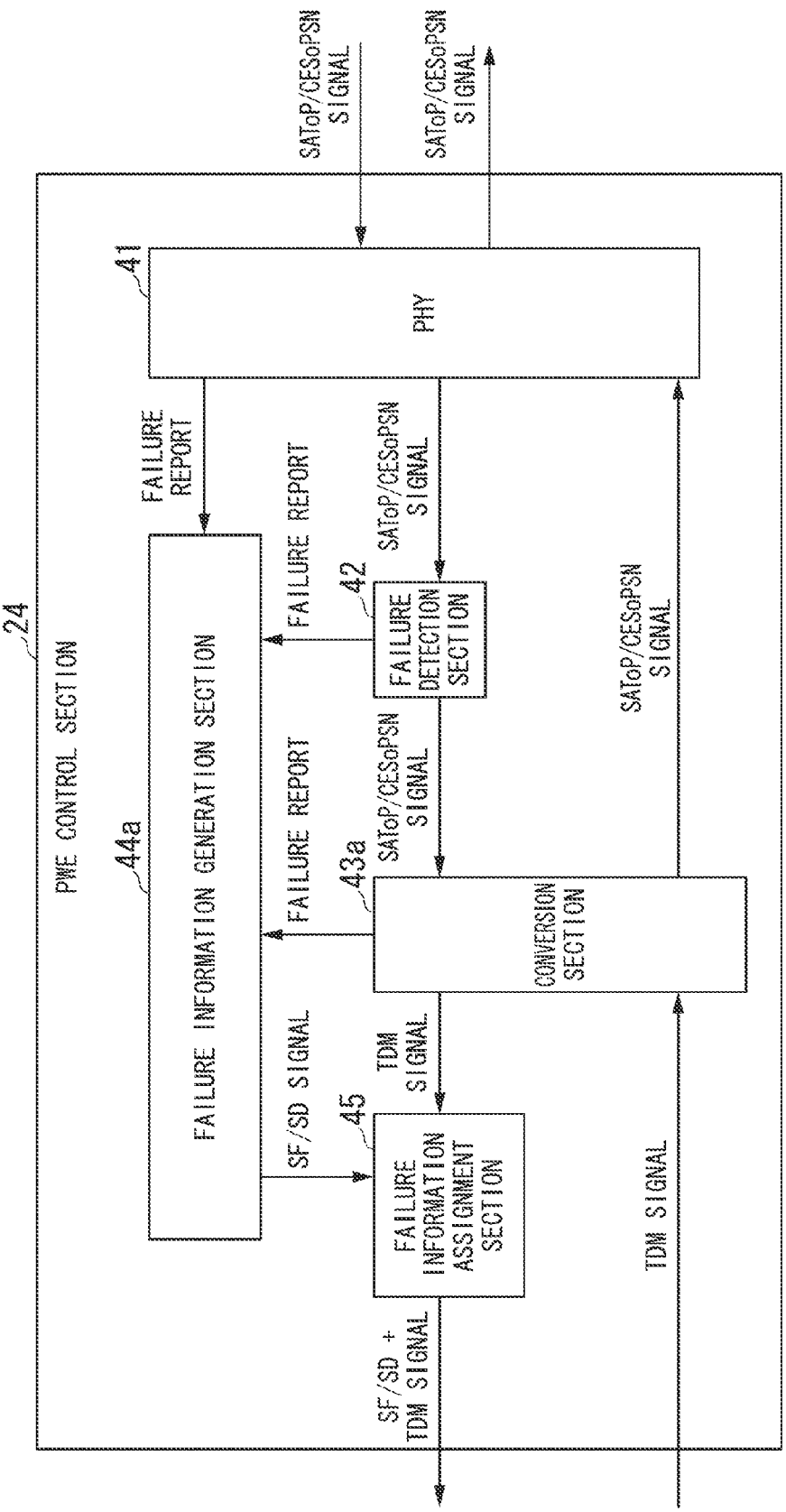
FIG. 4 is a schematic block illustrating a functional configuration of a pseudo wire emulation (PWE) control section of the first embodiment.

FIG. 4 is a schematic block diagram illustrating a functional configuration of the PWE control section 24a of the first embodiment. The PWE control section 24a is configured, for example, using a PWE card. The PWE control section 24a includes PHY 41, a failure detection section 42, a conversion section 43a, a failure information generation section 44a, and a failure information assignment section 45. All or some functions of the PWE control section 24a may be implemented using hardware such as an ASIC, a PLD, and/or an FPGA.

The PHY 41 is configured using a chip to perform a process of a physical layer and operates as an interface with an Internet protocol (IP) link of the packet network 4. Specifically, the PHY 41 receives a packet from the packet network 4, and transmits the received packet to the failure detection section 42. In addition, the PHY 41 receives a packet from the conversion section 43a, and transmits the received packet to the packet network 4. The packet received by the PHY 41 is generated, for example, using technology of TDM over packet (TDMoP) such as structure-agnostic TDM over packet (SAToP) or a circuit emulation services over packet switched network (CESoPSN). In the following description and FIG. 4, a packet signal will be described as an SAToP/CESoPSN signal.

In addition, the PHY 41 senses the occurrence of a failure in the packet network 4 or the relay apparatus 5a of an opposite side connected via the packet network 4. For example, the PHY 41a senses a failure as a link disconnection when a failure has occurred in a cable. In addition, the PHY 41 senses a failure as a link disconnection or lost synchronization when the failure has occurred in the PWE control section 24a of the relay apparatus 5a of the opposite side. In addition, the PHY 41 may be configured to sense the degradation of a signal (error rate or the like) when the cable is configured using an optical cable. Other technology may be applied as technology in which the PHY 41 senses a failure. The PHY 41 reports information regarding the sensed failure to the failure information generation section 44a. As described above, the PHY 41 has a function as at least a second sensing section.

The failure detection section 42 receives an SAToP/CESoPSN signal from the PHY 41, and detects a failure based on a checksum code. A specific example of the checksum code is a frame check sequence (FCS). In addition, when the redundant network system 100 is under an environment in which an Ether-operations, administration, and maintenance (OAM) function can be used, the failure detection section 42 may detect a failure based on the non-reception of Ethernet-continuity check (CC). The failure detection section 42 reports information regarding the sensed failure to the failure information generation section 44a. In addition, the failure detection section 42 transmits the SAToP/CESoPSN signal received from the PHY 41 to the conversion section 43a.

The conversion section 43a performs a conversion process for a TDM signal and a packet based on pseudo-wire emulation edge-to-edge (PWE3) technology. Specifically, the process is as follows. The conversion section 43a receives an SAToP/CESoPSN signal from the failure detection section 42. The conversion section 43a generates a TDM signal by decapsulating the received SAToP/CESoPSN signal from the failure detection section 42, and transmits the TDM signal to the failure information assignment section 45. In addition, the conversion section 43a receives the TDM signal from the relay section 22a. The conversion section 43a generates an SAToP/CESoPSN signal by encapsulating the received TDM signal, and transmits the SAToP/CESoPSN signal to the PHY 41.

In addition, the conversion section 43a detects a failure such as an error during decapsulation or lost synchronization in the TDM signal after decapsulation. The conversion section 43a reports information regarding the detected failure to the failure information generation section 44a.

The failure information generation section 44a receives information regarding a failure from the PHY 41, the failure detection section 42, and the conversion section 43a. The failure information generation section 44a assigns the information regarding the failure reported from the PHY 41, the failure detection section 42, and the conversion section 43a to an SF/SD label, and generates an SF/SD signal. More specifically, a value of the SF/SD signal is preset for each piece of content or degree of a failure (error) that is likely to be reported from the PHY 41, the failure detection section 42, and the conversion section 43a to the failure information generation section 44a. The failure information generation section 44a pre-stores a failure table in which the content and degrees of failures are associated with SF/SD signals. The failure information generation section 44a selects an SF/SD signal corresponding to a failure report received from the PHY 41, the failure detection section 42, and the conversion section 43a according to the failure table. The failure information generation section 44a generates the selected SF/SD signal, and transmits the generated SF/SD signal to the failure information assignment section 45.

The failure information assignment section 45 receives a TDM signal from the conversion section 43a. In addition, the failure information assignment section 45 receives the SF/SD signal from the failure information generation section 44a. The failure information assignment section 45 assigns the SF/SD signal received from the failure information generation section 44a to the TDM signal received from the conversion section 43a, and generates an (SF/SD+TDM) signal. The failure information assignment section 45 transmits the generated (SF/SD+TDM) signal to the relay section 22a.

Figure 5:
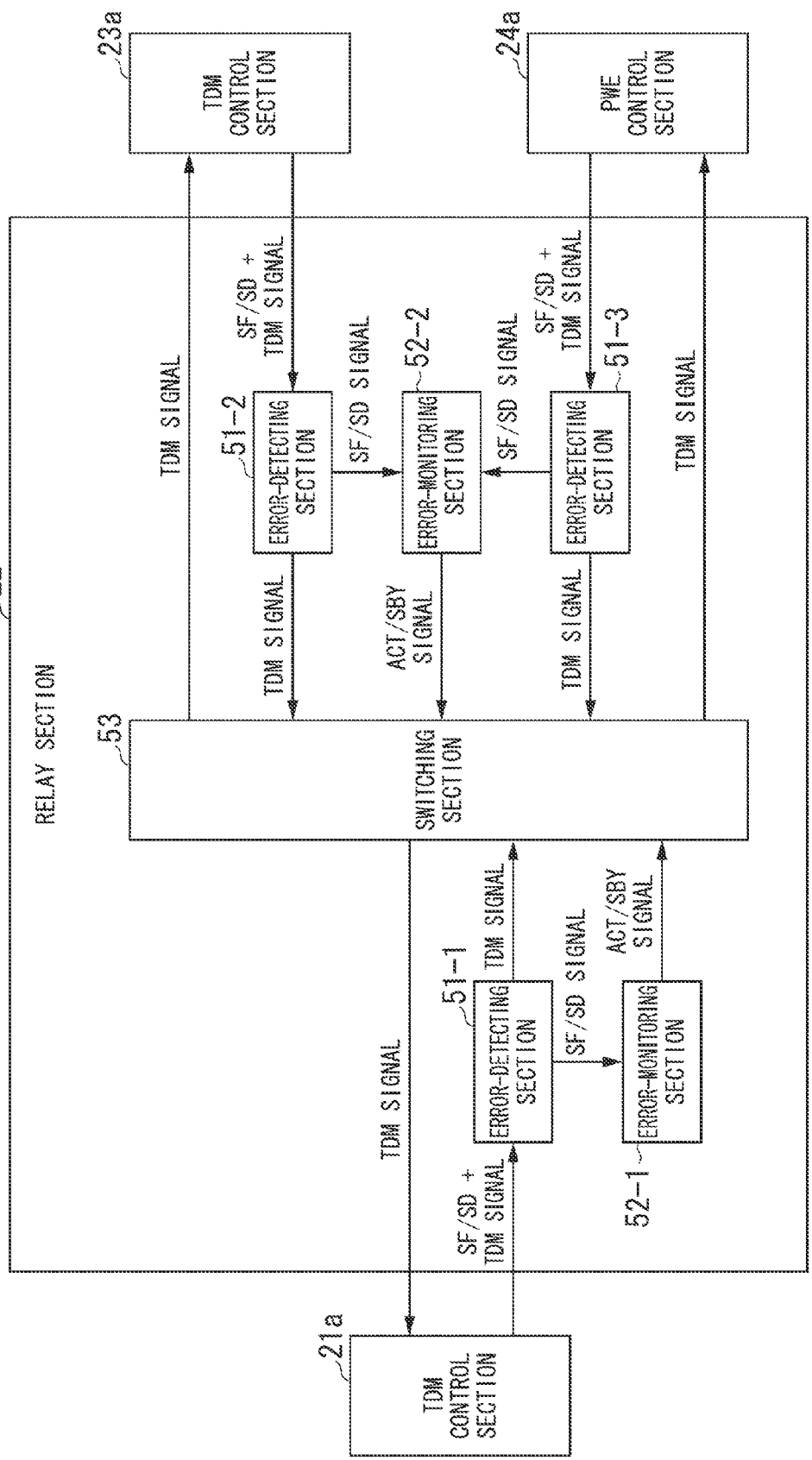
FIG. 5 is a schematic block diagram illustrating a functional configuration of a relay section of the first embodiment.

FIG. 5 is a schematic block diagram illustrating a functional configuration of the relay section 22a of the first embodiment. The relay section 22a includes error-detecting sections 51-1 to 51-3, error-monitoring sections 52-1 and 52-2, and a switching section 53. All or some functions of the relay section 22a may be implemented using hardware such as an ASIC, a PLD, and/or an FPGA.

The error-detecting section 51-1 receives an (SF/SD+TDM) signal from the TDM control section 21a, and separates the (SF/SD+TDM) signal into an SF/SD signal and a TDM signal. The error-detecting section 51-1 transmits the SF/SD signal to the error-monitoring section 52-1, and transmits the TDM signal to the switching section 53.

The error-detecting section 51-2 receives an (SF/SD+TDM) signal from the TDM control section 23a, and separates the (SF/SD+TDM) signal into an SF/SD signal and a TDM signal. The error-detecting section 51-2 transmits the SF/SD signal to the error-monitoring section 52-2, and transmits the TDM signal to the switching section 53.

The error-detecting section 51-3 receives an (SF/SD+TDM) signal from the PWE control section 24a, and separates the (SF/SD+TDM) signal into an SF/SD signal and a TDM signal. The error-detecting section 51-3 transmits the SF/SD signal to the error-monitoring section 52-2, and transmits the TDM signal to the switching section 53.

The error-monitoring section 52-1 receives the SF/SD signal from the error-detecting section 51-1, and determines a path to be operated as the ACT system based on the SF/SD signal. However, in this embodiment, only a path (the TDM network 1) of the TDM control section 21a is connected to the error-monitoring section 52-1. Thus, the error-monitoring section 52-1 constantly selects the TDM control section 21a as the ACT system. The error-monitoring section 52-1 generates an ACT/SBY signal indicating the path of the ACT system, and transmits the ACT/SBY signal to the switching section 53.

The error-monitoring section 52-2 receives SF/SD signals from the error-detecting sections 51-2 and 51-3, and determines a path to be operated as the ACT system based on the SF/SD signals. Because the path (TDM network 2) of the TDM control section 23a and the path (packet network 4) of the PWE control section 24a are connected to the error-monitoring section 52-2, the error-monitoring section 52-2 selects a path to be operated as the ACT system from the two paths.

The error-monitoring section 52-2 selects the path to be operated as the ACT system, for example, according to a preset determination criterion. More specifically, an error level is preset for each SF/SD signal that is likely to be transmitted by the TDM control section 23a and the PWE control section 24a. The error-monitoring section 52-2 pre-stores an error level table in which SF/SD signals are associated with error levels. The error-monitoring section 52-2 selects an error level corresponding to an SF/SD signal received from the error-detecting section 51-2 and an error level corresponding to an SF/SD signal received from the error-detecting section 51-3 according to the error level table. The error-monitoring section 52-2 selects a path having a lower error level as a path to be operated as the ACT system. The error-monitoring section 52-2 generates an ACT/SBY signal indicating the path of the ACT system, and transmits the ACT/SBY signal to the switching section 53.

The switching section 53 receives the ACT/SBY signal from the error-monitoring section 52-1, and performs path switching so that the path of the ACT system indicated by the received ACT/SBY signal is used. Specifically, the switching section 53 transmits a TDM signal received from the path of the ACT system indicated by the ACT/SBY signal received from the error-monitoring section 52-1 to a downstream side (the TDM control section 23a and the PWE control section 24a). In addition, the switching section 53 receives the ACT/SBY signal from the error-monitoring section 52-2, and performs path switching so that the path of the ACT system indicated by the received ACT/SBY signal is used. Specifically, the switching section 53 transmits a TDM signal received from the path of the ACT system indicated by the ACT/SBY signal received from the error-monitoring section 52-2 to a downstream side (the TDM control section 21a).

Figures 6, 7:
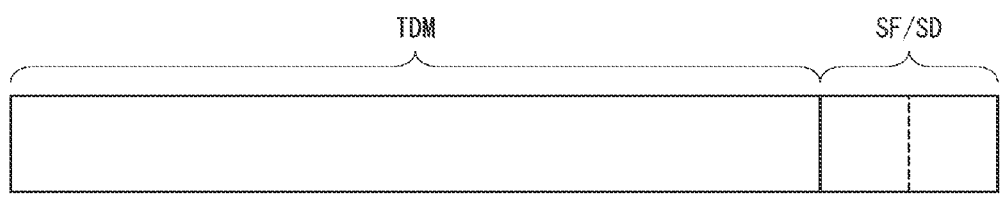
FIG. 6 is a diagram illustrating a specific example of an error level table.
FIG. 7 is a diagram illustrating a configuration example of a (signal failure/signal degrade (SF/SD)+TDM) signal.

FIG. 6 is a diagram illustrating a specific example of the error level table. In the error level table illustrated in FIG. 6, a different error level is associated for each combination of an SF value and an SD value. In the case of FIG. 6, for example, an error level value of "1" is associated with an SF value of "0" and an SD value of "0." In this case, the error-monitoring section 52-2 determines that the error level is "1" when receiving an SF/SD signal in which the SF value is "0" and the SD value is "0." Although each of the SF value and the SD value is expressed by a 1-digit binary number (1 bit) in FIG. 6, the value may be expressed by a number of digits and the number of digits of the SF value may be different from that of the SD value. In addition, the error level need not be limited to 1 to 4, and various types of error levels may be set.

FIG. 7 is a diagram illustrating a configuration example of the (SF/SD+TDM) signal. In the case of FIG. 7, the SF/SD signal is included as the overhead of the TDM signal (TDM frame).

Figure 8:
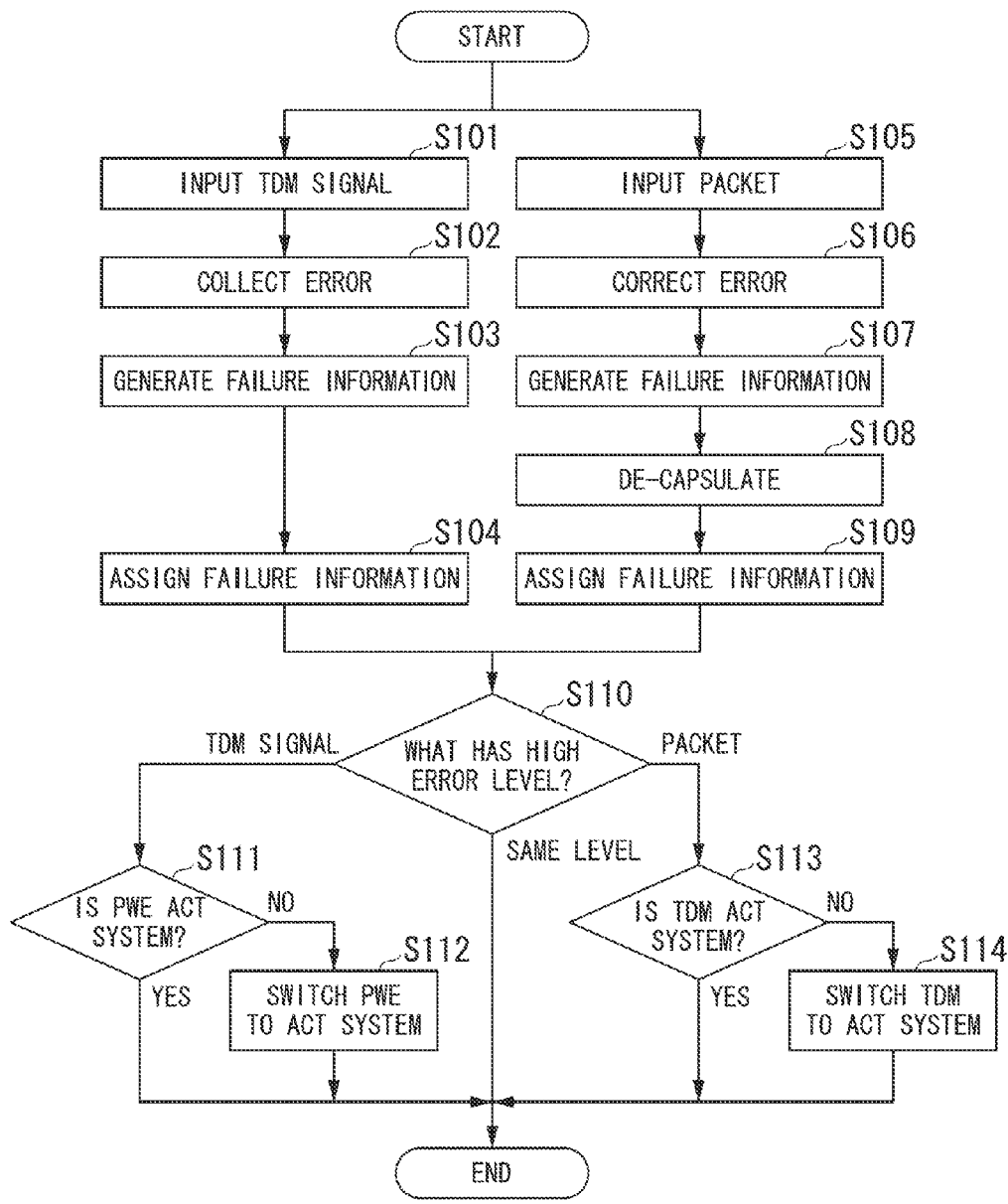
FIG. 8 is a flowchart illustrating a processing flow of the relay apparatus of the first embodiment.

FIG. 8 is a flowchart illustrating a processing flow of the relay apparatus 5a of the first embodiment. In this embodiment, the TDM network 1 is constantly selected as the path of the ACT system. Thus, in the following description, a process related to the TDM network 2 and the packet network 4 among processes of the relay apparatus 5a will be described.

First, a TDM signal or a packet is input to the relay apparatus 5a. If the TDM signal is input to the PHY 31a of the TDM control section 23a (step S101), the PHY 31a senses a failure from the input TDM signal (step S102). The PHY 31a reports information regarding the sensed failure to the failure information generation section 32a. The failure information generation section 32a generates an SF/SD signal based on the content or degree of the failure reported from the PHY 31a, and transmits the SF/D signal to the failure information assignment section 33 (step S103). When receiving the SF/SD signal from the failure information generation section 32a, the failure information assignment section 33 generates an (SF/SD+TDM) signal by assigning the received SF/SD signal to the TDM signal received from the PHY 31a (step S104). The failure information assignment section 33 transmits the generated (SF/SD+TDM) signal to the relay section 22a.

If the packet (SAToP/CESoPSN signal) is input to the PHY 41 of the PWE control section 24a (step S105), the PHY 41, the failure detection section 42, and the conversion section 43a each sense a failure from the input packet (step S106). The PHY 41, the failure detection section 42, and the conversion section 43a each report information regarding the sensed failure to the failure information generation section 44a. The failure information generation section 44a generates an SF/SD signal based on the content or degree of the reported failure, and transmits the SF/SD signal to the failure information assignment section 45 (step S107). In addition, in parallel with the process of steps S106 and S107, the conversion section 43a extracts a TDM signal by performing a decapsulation process for the packet input to the PHY 41 (step S108). If the failure information assignment section 45 receives the SF/SD signal from the failure information generation section 44a, an (SF/SD+TDM) signal is generated by assigning the received SF/SD signal to the TDM signal received from the conversion section 43a (step S109). The failure information assignment section 45 transmits the generated (SF/SD+TDM) to the relay section 22a.

Next, when receiving an (SF/SD+TDM) signal from the TDM control section 23a, the error-detecting section 51-2 of the relay section 22a separates the (SF/SD+TDM) signal into a TDM signal and an SF/SD signal. The error-detecting section 51-2 transmits the TDM signal to the switching section 53, and transmits the SF/SD signal to the error-monitoring section 52-2. When receiving an (SF/SD+TDM) signal from the PWE control section 24a, the error-detecting section 51-3 of the relay section 22a separates the (SF/SD+TDM) signal into a TDM signal and an SF/SD signal. The error-detecting section 51-3 transmits the TDM signal to the switching section 53, and transmits the SF/SD signal to the error-monitoring section 52-2.

The error-monitoring section 52-2 selects an error level corresponding to each received SF/SD signal based on the error level table. It is determined which error level is high (step S110).

If the error level of the SF/SD signal related to the TDM signal is high (TDM SIGNAL in step S110), the error-monitoring section 52-2 selects the packet network 4 as a path of the ACT system. The error-monitoring section 52-2 generates an ACT/SBY signal indicating that the packet network 4 is the ACT system, and transmits the ACT/SBY signal to the switching section 53. The switching section 53 determines whether or not the path used as the current ACT system is a path (the packet network 4) of the side of the PWE control section 24a (step S111). If the path of the side of the PWE control section 24a is the current ACT system (YES in step S111), the switching section 53 does not perform a particular process. On the other hand, if the path of the side of the PWE control section 24a is not the current ACT system (NO in step S111), the switching section 53 switches the path of the side of the PWE control section 24a to the ACT system (step S112).

If the error level of the SF/SD signal related to the packet is high in the process of step S110 (PACKET in step S110), the error-monitoring section 52-2 selects the TDM network 2 as the path of the ACT system. The error-monitoring section 52-2 generates an ACT/SBY signal indicating that the TDM network 2 is the ACT system, and transmits the ACT/SBY signal to the switching section 53. The switching section 53 determines whether or not the path used as the ACT system is a path (the TDM network 2) of the side of the TDM control section 23a (step S113). If the path of the side of the TDM control section 23a is the current ACT system (YES in step S113), the switching section 53 does not perform a particular process. On the other hand, if the path of the side of the TDM control section 23a is not the current ACT system (NO in step S113), the switching section 53 switches the path of the side of the TDM control section 23a to the ACT system (step S114).

If the error levels are the same in the process of step S110, the switching section 53 does not perform a particular process.

The relay apparatus 5a iteratively executes the above process. A cycle or timing in which the relay apparatus 5a iterates the above-described process is appropriately set. For example, the relay apparatus 5a may iteratively execute the above-described process every time a predetermined number of TDM signals or packets are input or every time a predetermined time has elapsed.

The relay apparatus 5 includes control sections (the TDM control section 23a and the PWE control section 24a) corresponding to different types of networks, and the relay section 22a switches the path of the ACT system according to a state of a failure of each path. Thus, it is possible to form redundancy without being limited to switching of a one-to-one link in the same type of networks. Therefore, the degree of freedom of network construction can be improved and a higher reliability network can be constructed.

Modified Example

It is not necessary to limit a packet generation method of the PWE control section 24a to a method of generating a packet by encapsulating a TDM signal. A packet including a TDM signal may be generated according to other methods.

In addition, error information may be generated and transmitted as another signal as well as an SF/SD signal.

In addition, the PHY 41 is not limited to an interface with an IP link because it is preferable that the PHY 41 operate as an interface with a link of the packet network 4. For example, the PHY 41 may be an interface with a link such as an Ether link or a multi-protocol label-switching (MPLS) link.

In addition, the relay apparatus 5a may be further configured so that a PWE control section having the same configuration as the PWE control section 24a and an error-detecting section having the same configuration as the error-detecting section 51-3 are provided at the side of the TDM control section 21a. According to the configuration as described above, the ACT system and the SBY system may be configured to be independently switched on the left and right of FIG. 2. In this case, for example, networks connected as ACT systems on the left and right of the FIG. 2 may be switched to be different types.

In addition, the relay apparatus 5a may be further configured so that a TDM control section having the same configuration as the TDM control section 21a and an error-detecting section having the same configuration as the error-detecting section 51-1 are provided at the side of the TDM control section 21a. According to the configuration as described above, a plurality of TDM networks may be connected on the left of FIG. 2, and the ACT system and the SBY system may be configured to be switched from among the TDM networks.

In addition, the PHY 31a, the PHY 41, the failure detection section 42, and the conversion section 43a may be configured to detect performance (a transmission speed, an error rate, or the like) of transmission in the TDM network 2 or the packet network 4 as well as information regarding a failure, and report the detected information and performance to the failure information generation section 32a and the failure information generation section 44a. In this case, the failure information generation section 32a and the failure information generation section 44a may generate an SF/SD signal indicating transmission performance. Further, the error-monitoring sections 52-1 and 52-2 may be configured to determine a performance level based on the SF/SD signal indicating transmission performance and select a path in which a degree of transmission performance is high as a path of the ACT system. In this case, the failure information generation sections 32a and 44a pre-store a performance table in which content of the transmission performance is associated with SF/SD signals in place of the failure table. In addition, the error-monitoring section 52-2 pre-stores a performance level table in which SF/SD signals are associated with performance levels in place of the error level table.

Second Embodiment

Figure 9:
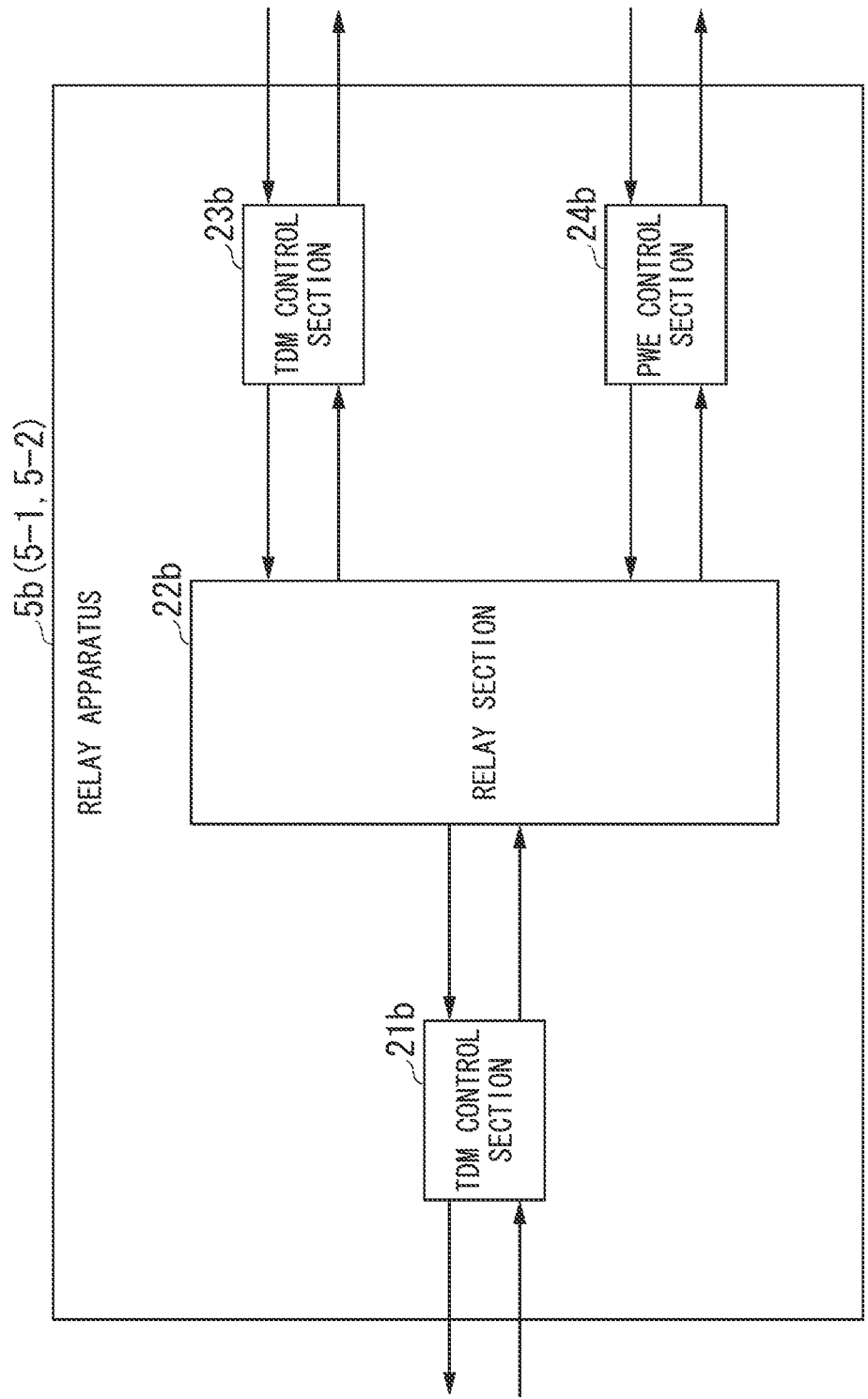
FIG. 9 is a schematic block diagram illustrating a functional configuration of a relay apparatus of a second embodiment.

FIG. 9 is a schematic block diagram illustrating a functional configuration of the relay apparatus 5b (5-1, 5-2) of the second embodiment. The relay apparatus 5b includes a TDM control section 21b, a relay section 22b, a TDM control section 23b, and a PWE control section 24b. Hereinafter, a configuration of the relay apparatus 5b different from the relay apparatus 5a of the first embodiment will mainly be described.

Figure 10:
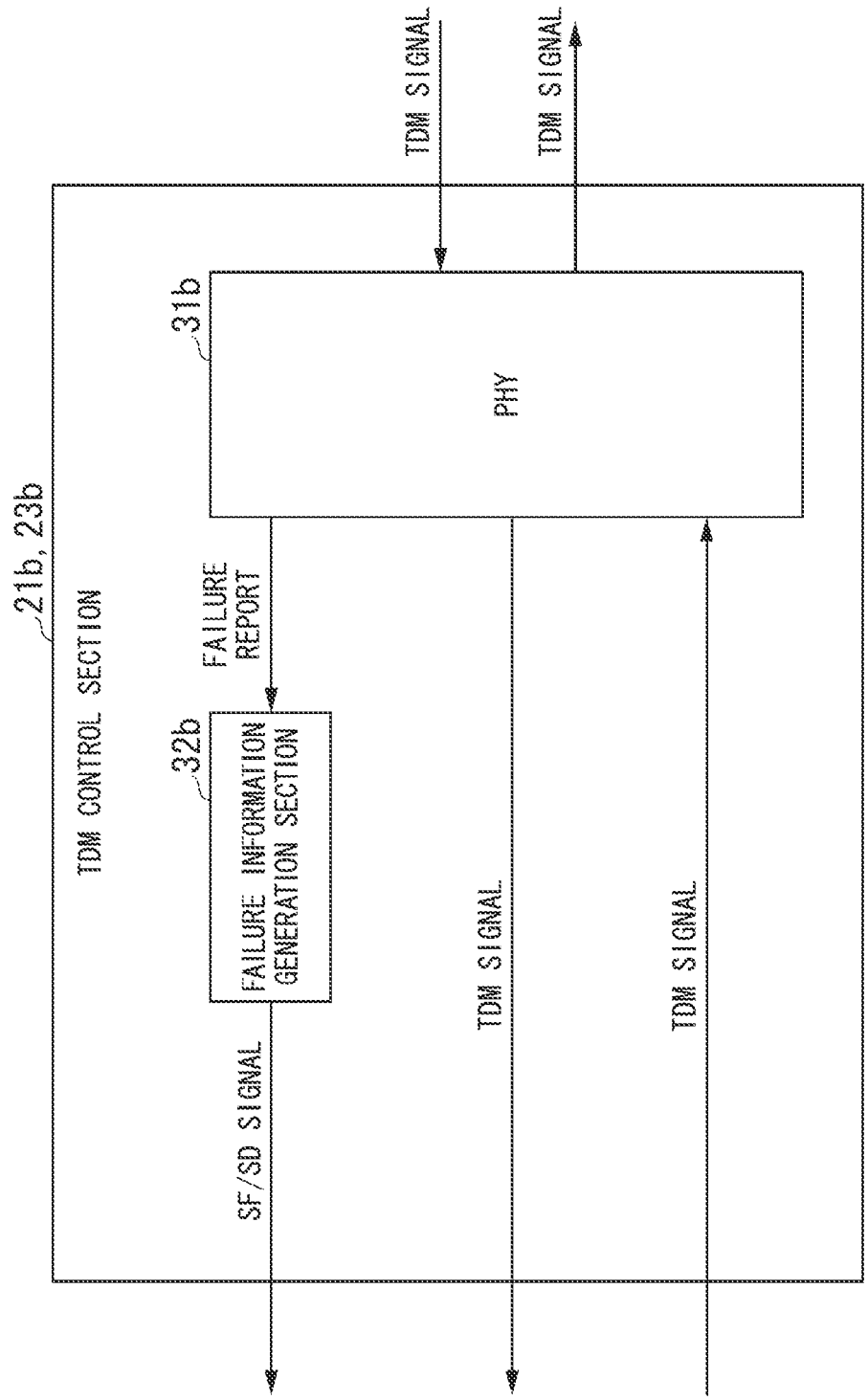
FIG. 10 is a schematic block diagram illustrating a functional configuration of TDM control sections of the second embodiment.

FIG. 10 is a schematic block diagram illustrating a functional configuration of the TDM control sections 21b and 23b of the second embodiment. The TDM control sections 21b and 23b have the same configuration except that a connected TDM network is different. Hereinafter, the TDM control sections 21b and 23b will be described with reference to an example of the TDM control section 23b. The TDM control section 23b includes PHY 31b and a failure information generation section 32b.

The PHY 31b transmits a TDM signal to the relay section 22b instead of the failure information assignment section 33. The failure information generation section 32b transmits an SF/SD signal to the relay section 22b instead of the failure information assignment section 33. At this time, the failure information generation section 32b transmits the SF/SD signal to the relay section 22b in the path different from that of a TDM signal (main signal). As the path different from that of the TDM signal, for example, a path of in-band communication is used and configured.

Figure 11:
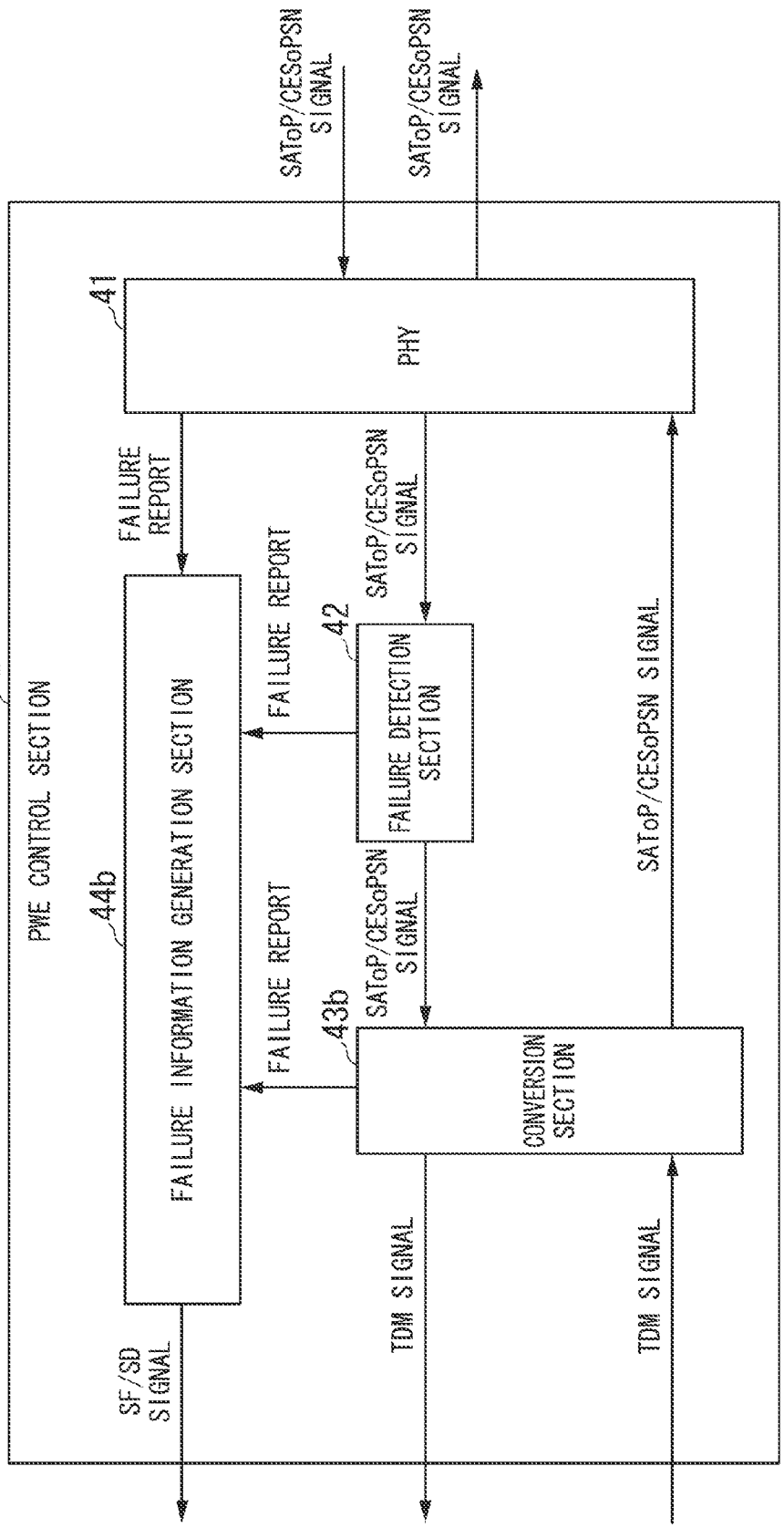
FIG. 11 is a schematic block diagram illustrating a functional configuration of a PWE control section of the second embodiment.

FIG. 11 is a schematic block diagram illustrating a functional configuration of the PWE control section 24b of the second embodiment. The PWE control section 24b includes PHY 41, a failure detection section 42, a conversion section 43b, and a failure information generation section 44b. Because the PHY 41 and the failure detection section 42 have the same configurations as in the first embodiment, the same configurations are denoted by the same reference numerals as in the first embodiment, and description thereof is omitted.

The conversion section 43b transmits a TDM signal generated by decapsulation to the relay section 22b instead of the failure information assignment section 45. The failure information generation section 44b transmits an SF/SD signal to the relay section 22b instead of the failure information assignment section 45. At this time, the failure information generation section 44b transmits the SF/SD signal to the relay section 22b in a path different from that of the TDM signal (main signal). As the path different from that of the TDM signal, for example, a path of in-band communication is used and configured.

Figure 12:
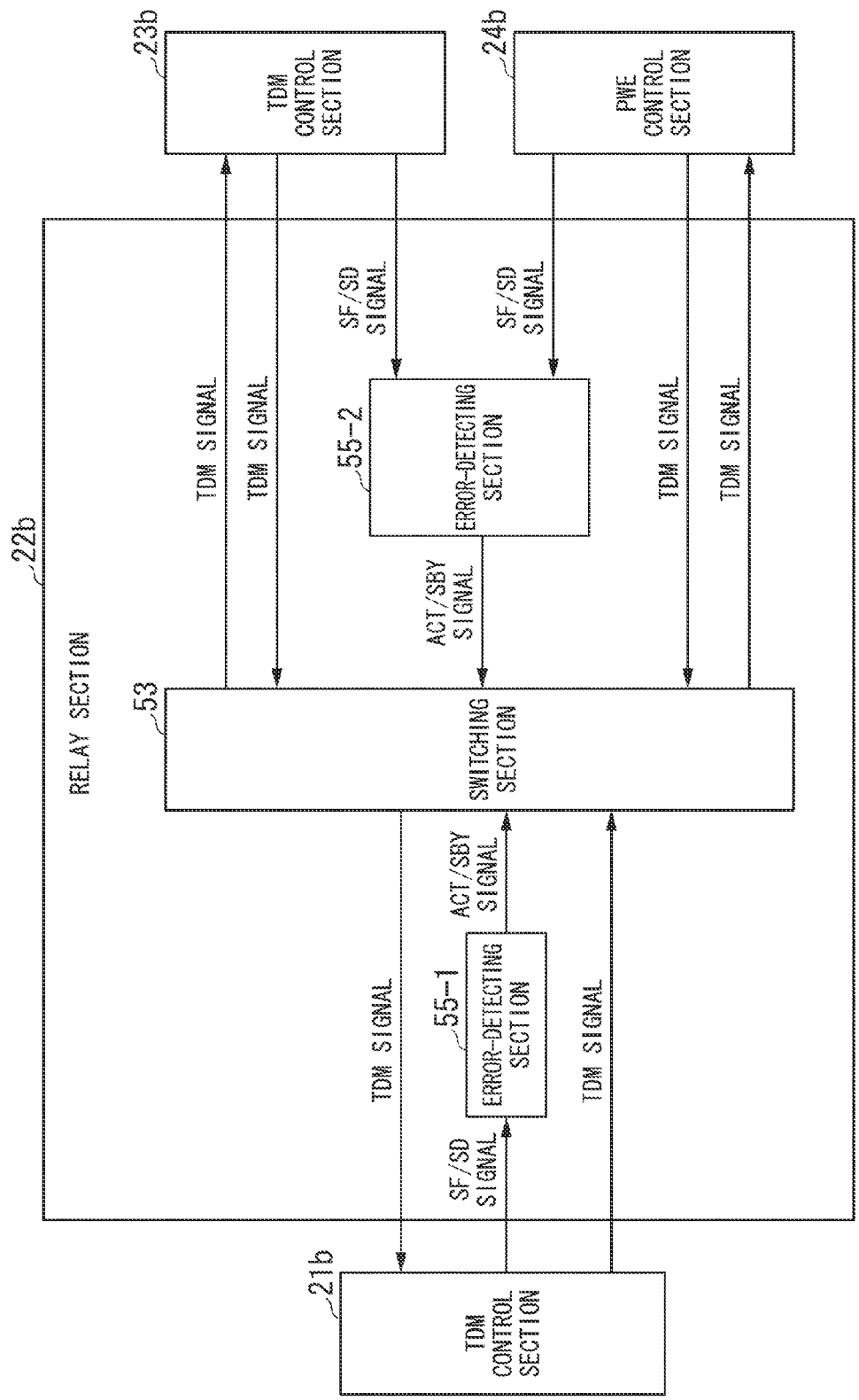
FIG. 12 is a schematic block diagram illustrating a functional configuration of a relay section of the second embodiment.

FIG. 12 is a schematic block diagram illustrating a functional configuration of the relay section 22b of the second embodiment. The relay section 22b includes a switching section 53, an error-detecting section 55-1, and an error-detecting section 55-2. Because the switching section 53 has the same configuration as in the first embodiment, the same configuration is denoted by the same reference numeral as in the first embodiment, and description thereof is omitted. The error-detecting sections 55-1 and 55-2 may be configured by executing an error detection program in a CPU or may be implemented using hardware such as an ASIC, a PLD, and/or an FPGA. The error detection program may be recorded on a computer-readable recording medium. An example of the computer-readable recording medium is a flexible disk, a magneto-optical disc, a ROM, a portable medium such as a CD-ROM, or a storage apparatus such as a hard disk embedded in a computer system.

The error-detecting section 55-1 receives an SF/SD signal from the TDM control section 21b. The error-detecting section 55-1 generates an ACT/SBY signal according to the same process as in the error-monitoring section 52-1 of the first embodiment, and transmits the ACT/SBY signal to the switching section 53.

The error-detecting section 55-2 receives an SF/SD signal from the TDM control section 23b. In addition, the error-detecting section 55-2 receives an SF/SD signal from the PWE control section 24b. According to the same process as in the error-monitoring section 52-2 of the first embodiment, the error-detecting section 55-2 generates an ACT/SBY signal and transmits the ACT/SBY signal to the switching section 53.

In the relay apparatus 5b configured as described above, the TDM control section 21b, the TDM control section 23b, and the PWE control section 24b need not generate an (SF/SD+TDM) signal by assigning an SF/SD signal to a TDM signal. Thus, the TDM control sections 21b and 23b need not include the failure information assignment section 33. In addition, the PWE control section 24b need not include the failure information assignment section 45. Therefore, it is possible to reduce configuration scales of the TDM control sections 21b and 23b and the PWE control section 24b. In addition, in the relay apparatus 5b, the relay section 22b need not separate an SF/SD signal and a TDM signal from an (SF/SD+TDM) signal. Thus, the relay section 22b need not include the error-detecting sections 51-1 to 51-3. Therefore, it is possible to reduce a configuration scale of the relay section 22b.

Modified Example

The relay apparatus 5b of the second embodiment may be modified and configured as in the relay apparatus 5a of the first embodiment.

Application Example

Figure 13:
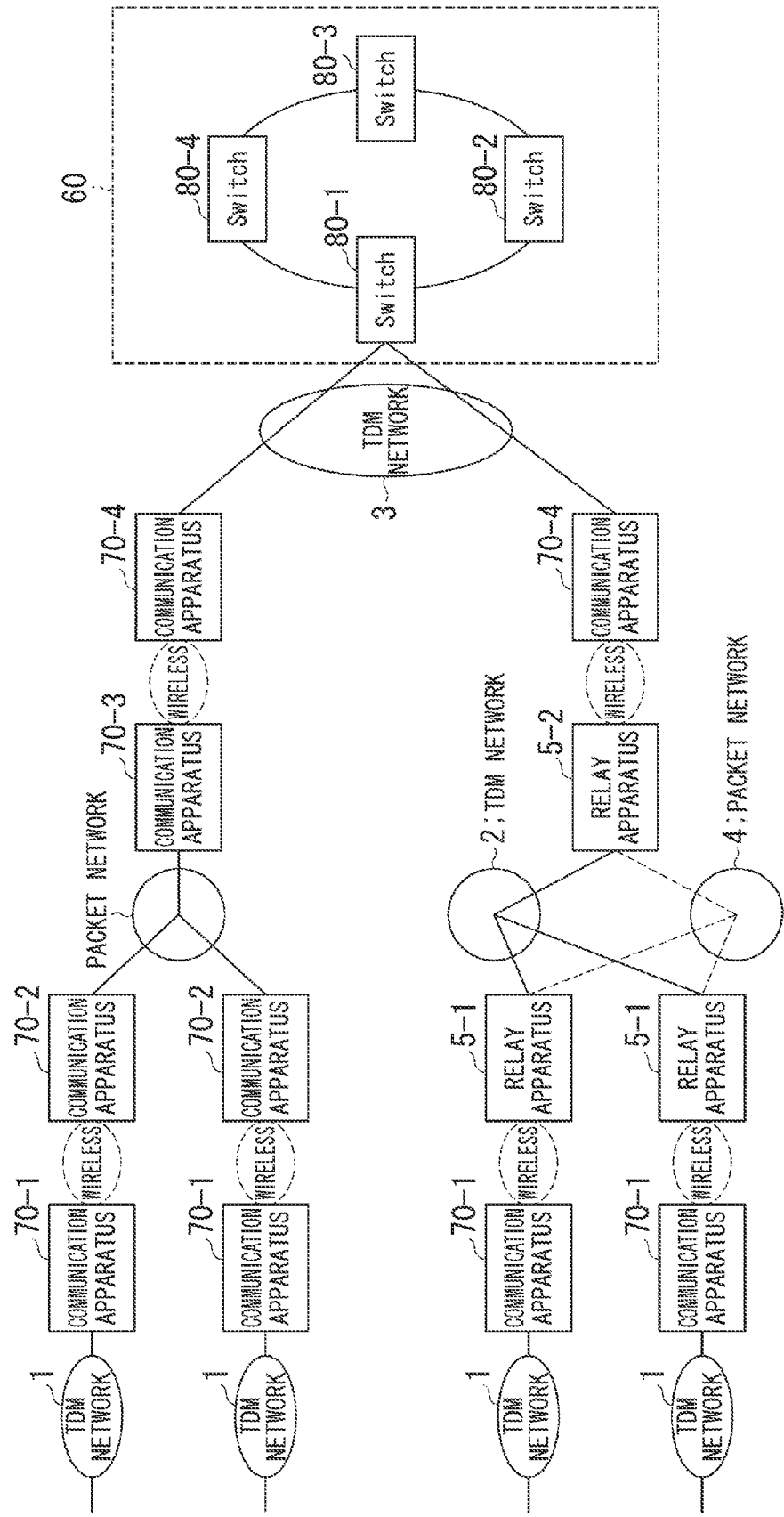
FIG. 13 is a diagram illustrating an application example of the relay apparatus.

FIG. 13 is a diagram illustrating an application example of the relay apparatus 5 (5a, 5b). FIG. 13 illustrates a network configuration in which a plurality of TDM networks 1 are connected to a synchronous digital hierarchy/synchronous optical network (SDH/SONET) link 60. In FIG. 13, the same configurations as in the device and the network described with reference to the above-described embodiments are denoted by the same reference numerals as in FIG. 1. Although one relay apparatus 5-1 is connected to one relay apparatus 5-2 in FIG. 1, two relay apparatuses 5-1 are connected to one relay apparatus 5-2 in FIG. 13. As described above, a plurality of relay apparatuses 5-1 may be connected to one relay apparatus 5-2. In addition, one relay apparatus 5-1 may be connected to a plurality of relay apparatuses 5-2, and a plurality of relay apparatuses 5-1 may be connected to a plurality of relay apparatuses 5-2.

In the network of FIG. 13, the SDH/SONET link 60 is configured using a plurality of switches 80-1 to 80-4. In addition, a wireless network of FIG. 13 (represented as "WIRELESS" in FIG. 13) is configured using existing wireless communication technology, and is implemented, for example, by microwave communication.

A communication apparatus 70-1 receives a TDM signal from the TDM network 1. The communication apparatus 70-1 transmits the received TDM signal to an apparatus (a communication apparatus 70-2 or the relay apparatus 5-1) of an opposite side of the wireless network. The communication apparatus 70-2 receives the TDM signal via the wireless network. The communication apparatus 70-2 converts the received TDM signal into a packet based on PWE3 technology, and transmits the packet to a communication apparatus 70-3 via a packet network. The communication apparatus 70-3 receives the packet via the packet network. Based on the PWE3 technology, the communication apparatus 70-3 extracts a TDM signal from the received packet, and transmits the TDM signal to a communication apparatus 70-4 via the wireless network.

The relay apparatus 5-1 receives the TDM signal via the wireless network. The relay apparatus 5 may be configured to receive the TDM signal via the wireless network as described above. In this case, for example, the PHY 31 (31*a*, 31*b*) of the TDM control section 21*a* is configured using an apparatus corresponding to the wireless network. As described above, the relay apparatus 5-1 selects a path of an ACT system from the TDM network 2 and the packet network 4. The relay apparatus 5-1 transmits a TDM signal to the relay apparatus 5-2 via the selected path of the ACT system. The relay apparatus 5-2 receives the TDM signal via the path of the ACT system, and transmits the TDM signal to the communication apparatus 70-4 via the wireless network.

The relay apparatus 70-4 receives the TDM signal via the wireless network. The relay apparatus 70-4 transmits the received TDM signal to the switch 80-1 of the SDH/SONET link 60 via the TDM network 3. In addition, when a signal is transmitted from the SDH/SONET link 60 to the TDM network 1, communication is performed in a reverse flow to the above description.

Figure 14:
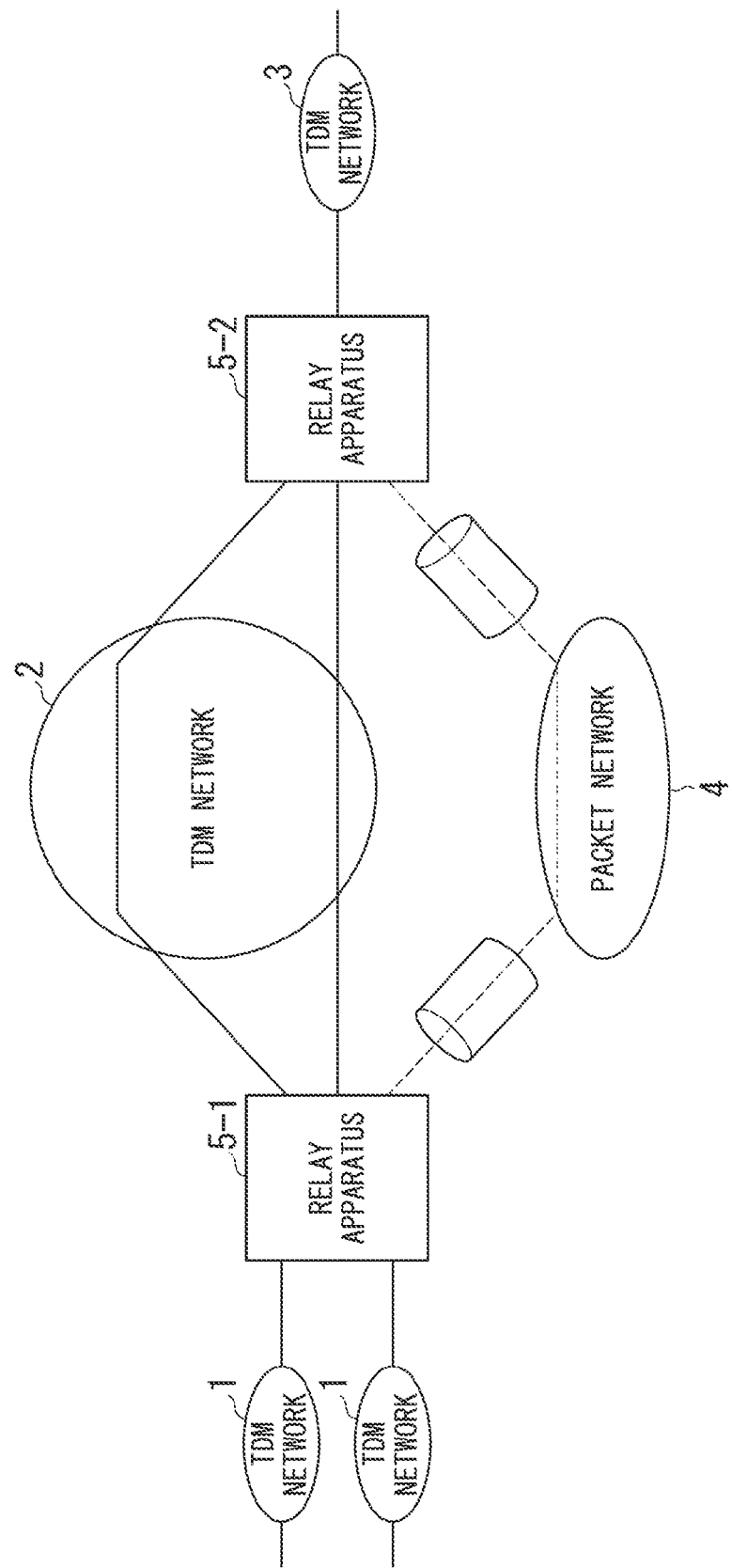
FIG. 14 is a diagram illustrating another application example of the relay apparatus.

FIG. 14 is a diagram illustrating another application example of the relay apparatus 5. In the network of FIG. 1, there are one path of the TDM network 2 and one path of the packet network 4 between the relay apparatus 5-1 and the relay apparatus 5-2. On the other hand, as illustrated in FIG. 14, a plurality of paths of the TDM network 2 may be provided between the relay apparatuses 5-1 and 5-2. In addition, a plurality of paths of the packet network 4 may be provided. Similarly, a plurality of paths of each of the TDM network 2 and the packet network 4 may be provided. In this case, the relay apparatuses 5-1 and 5-2 select and use a path of the ACT system from among the three or more paths described above. In addition, when the relay apparatuses 5-1 and 5-2 are configured to perform communication using a plurality of paths in parallel, the relay apparatuses 5-1 and 5-2 may select and use a plurality of paths as paths of the ACT system from among the above-described three or more paths.

In addition, the relay apparatus 5 may be used during migration to an existing TDM network 2. Specifically, when migration is performed by installing the packet network 4 in place of the existing TDM network 2 between the TDM networks 1 and 3, the relay apparatuses 5-1 and 5-2 are installed between the TDM networks 1 and 3 as illustrated in FIG. 1. The path of the ACT system is switched from the TDM network 2 to the packet network 4 by controlling the switch section 53 of the relay apparatuses 5-1 and 5-2. It is possible to make a transition from the TDM network 2 to the packet network 4 without interrupting a link from the TDM network 1 to the TDM network 3 using the relay apparatus 5 during migration as described above. In addition, it is possible to cause the TDM network 2 to operate as the SBY system of the packet network 4 and construct a redundant network by connecting the TDM network 2 to the relay apparatus 5-1 and the relay apparatus 5-2 even after the transition.

Even when the transition to the packet network 4 is made, an SONET/SDH link is also available with Ethernet over SONET (EoSONET)/SDH. In addition, a link of the TDM network may be T1/E1 or another link.

Although the embodiments of the present invention have been described above with reference to the drawings, specific configurations are not limited to these embodiments, and designs can also be made without departing from the scope of the present invention.

Priority is claimed on Japanese Patent Application No. 2010-062695, filed Mar. 18, 2010, the contents of which are incorporated herein by reference.

INDUSTRIAL APPLICABILITY

The present invention can be applied to a communication network constructed using a plurality of different networks, for example, like a TDM network and a packet network.

REFERENCE SYMBOLS

1 to 3: TDM network
4: Packet network
5-1, 5-2: Relay apparatus
21*a*, 21*b*: TDM control section
22*a*, 22*b*: Relay section
23*a*, 23*b*: TDM control section
24*a*, 24*b*: PWE control section
31*a*, 31*b*: PHY
32: Failure information generation section
33: Failure information assignment section
41: PHY
42: Failure detection section
43*a*, 43*b*: Conversion section
44*a*, 44*b*: Failure information generation section
45: Failure information assignment section
51-1 to 51-3: Error-detecting section
52-1 to 52-2: Error-monitoring section
53: Switching section
55-1 to 55-2: Error-detecting section
56: Switching section
60: SDH/SONET link
70-1 to 70-4: Communication apparatus

The invention claimed is:

1. A relay apparatus comprising:
a first control section which connects to a first network;
a second control section which connects to a second network, the second network being of a type different from a type the first network; and
a relay section which selects a path to be operated as an active (ACT) system from the first network and the second network and performs path switching based on information regarding the first network and further information regarding the second network,
wherein the second control section converts a transmission unit for transmission in the first network into a transmission unit for transmission in the second network, and transmits the transmission unit to the second network,
the relay section receives i) information indicating a degree of a failure of the first network as the received information regarding the first network from the first control section, and ii) further information indicating a degree of a failure of the second network as the further information regarding the second network from the second control section, the relay section selects a path having a lower degree of a failure as the active (ACT) system based on the received information and the received further information, and then the relay section performs path switching based on selected the path,
the first network is a time-division multiplexing (TDM) network including a plurality of TDM communication apparatuses in which the TDM communication apparatuses transmit and receive a TDM signal as the transmission unit, and the second network is a packet network including a plurality of packet communication apparatuses in which the packet communication apparatuses transmit and receive a packet as the transmission unit, and the second control section converts a TDM signal into a packet and transmits the packet to the packet network.

2. The relay apparatus according to claim 1, wherein:

the first control section includes a first sensing section which senses the information regarding the first network, and the second control section includes a second sensing section which senses the information regarding the second network.

3. A relay method comprising the steps of:

converting, by a relay apparatus, a transmission unit for transmission in a first network into a transmission unit for transmission in a second network, and transmitting the transmission unit to the second network, wherein the relay apparatus includes a first control section for connecting to the first network and a second control section for connecting to the second network, the second network being of a type different from a type the first network; and selecting, by a relay section of the relay apparatus, a path to be operated as an ACT system from the first network and the second network and performing path switching based on information regarding the first network and further information regarding the second network, wherein, the relay section first receives i) information indicating a degree of a failure of the first network as the received information regarding the first network from the first control section, and ii) further information indicating a degree of a failure of the second network as the further information regarding the second network from the second control section, the relay section second selects a path having a lower degree of a failure as the active (ACT) system based on the received information and the received further information, and then the relay section third performs path switching based on selected the path, the first network is a time-division multiplexing (TDM) network including a plurality of TDM communication apparatuses in which the TDM communication apparatuses transmit and receive a TDM signal as the transmission unit, and the second network is a packet network including a plurality of packet communication apparatuses in which the packet communication apparatuses transmit and receive a packet as the transmission unit, and the second control section converts a TDM signal into a packet and transmits the packet to the packet network.

4. A non-transitory computer-readable recording medium in which a computer program is recorded, the computer program causes an apparatus, which includes a first control section for connecting to a first network and a second control section for connecting to a second network, the second network being of a type different from a type the first network, to execute the steps of:

converting a transmission unit for transmission in the first network into a transmission unit for transmission in the second network, and transmitting the transmission unit to the second network; and selecting a path to be operated as an ACT system from the first network and the second network and performing path switching based on information regarding the first network and further information regarding the second network, wherein, the apparatus first receives i) information indicating a degree of a failure of the first network as the received information regarding the first network from the first control section, and ii) further information indicating a degree of a failure of the second network as the further information regarding the second network from the second control section, the apparatus second selects a path having a lower degree of a failure as the active (ACT) system based on the received information and the received further information, and then the apparatus third performs path switching based on selected the path, the first network is a time-division multiplexing (TDM) network including a plurality of TDM communication apparatuses in which the TDM communication apparatuses transmit and receive a TDM signal as the transmission unit, and the second network is a packet network including a plurality of packet communication apparatuses in which the packet communication apparatuses transmit and receive a packet as the transmission unit, and the second control section converts a TDM signal into a packet and transmits the packet to the packet network.

* * * * *